March 10, 1959     C. F. WHITE     2,876,696

COMPRESSES

Filed Feb. 5, 1954     5 Sheets-Sheet 1

CECIL F. WHITE
INVENTOR
HUEBNER, BEEHLER,
WORREL & HERZIG
ATTORNEYS

March 10, 1959 C. F. WHITE 2,876,696
COMPRESSES
Filed Feb. 5, 1954 5 Sheets-Sheet 5

CECIL F. WHITE
INVENTOR
HUEBNER, BEEHLER,
WORREL & HERZIG
ATTORNEYS
BY

United States Patent Office

2,876,696
Patented Mar. 10, 1959

2,876,696

COMPRESSES

Cecil F. White, Oakland, Calif.

Application February 5, 1954, Serial No. 408,412

7 Claims. (Cl. 100—25)

The present invention relates to compresses of the type adapted to compress bulk material, such as cotton, into bales for handling and transporting convenience and more particularly to a compress having provision for the removal of bale-confining bands from gin bales or other relatively low compression bales, subjecting the bales to recompression, and rebanding the bales in the form of relatively high density units. The invention relates generally to my co-pending application entitled Compresses, Serial No. 305,106, filed August 19, 1952.

As described in the designated patent application, the conventional handling of cotton involves the ginning of freshly picked cotton at cotton gins which are widely dispersed throughout cotton producing areas; the compression of the cotton into low density bales, commonly referred to as gin bales, with the limited compressing apparatus available at the gins; transporting the gin bales to compresses frequently located at considerable distances from the gins; releasing the gin bales from confining bands applied thereto; subjecting the cotton of the released gin bales to high compressive forces; and rebanding the high density bales thus formed. Prior to the invention comprising the subject matter of the designated patent application, it was believed impossible to construct high density compresses sufficiently economically to make their ownership by gins economically feasible and equally impossible to construct high density compresses of sufficiently reduced weight to make portability thereof practical so that in effect the high density compresses could be brought to the gins for operation at the ginning and initial compressing locations. Such development by the prior invention made possible very substantial savings in time, expense and inconvenience conventionally incident to the handling, transporting, and rehandling of gin bales in their conveyance to the compresses.

While the present invention is limited neither to use on cotton nor to portability, its substantial advance over prior known apparatus for the purpose is conveniently illustrated by reference to the embodiment shown in the drawings which possesses portability and is adapted for use as a cotton compress.

Subsequent to the preceding invention of reference, it was discovered that adaptation to portability could be improved, speed of permitted operation greatly increased, maximum power requirements appreciably reduced, greater durability attained, operating expenses reduced, and other advantages made possible by certain modifications and refinements of the principles of the preceding invention. Such advantages are found to result either directly from the provision of a dinkey compress for the removable of bands from gin bales, a high density compress in spaced adjacent relation to the dinkey compress, and means for conveying gin bales from the dinkey compress to the high density compress; or to result from other improvements in the designateed combination or in elements thereof particularly suited to the combination or appurtenant thereto. By providing a separate dinkey compress for removing the bands from gin bales, means for conveying the released gin bales while maintained under adequate confining pressure from the dinkey compress to a main compress, and forming high density banded bales in the main compress; the procedure has been greatly expedited. This problem has been solved by the elevator and carriage assembly of the present invention. The association of said elevator and carriage assembly with the dinkey compress also has proved of significance in the speed, eas and dependability with which a released gin bale is grasped for movement. Still further, it has heretofore been regarded as necessary to provide a horizontally disposed access door to all bale compression chambers so that bales or other material to be compressed therein could be delivered thereto and removed therefrom. Such doors have presented problems of attaining sufficient rigidity, have been difficult to move, have not adequately resisted thrusts imposed thereagainst, and have generally required excessively heavy compress construction regarded as incompatible with portability. These and other difficulties have been overcome by the provision of a principal compressing chamber having no laterally disposed access door but which is loaded from the top and unloaded from the bottom. Still further, it has been generally considered necessary excessively to overcompress cotton bales in the formation of high density bales so that upon release of the compacting forces, permitted expansion of the bale returns the bale to desired density. Such conventionally required overcompression has proved expensive, required recessively heavy and costly equipment, and has proved a source of objectionable inefficiency. These difficulties have been obviated by avoiding or minimizing the expansion allowance and thus the necessity for excessive overcompression.

An object of the present invention is to provide an improved compress adapted to compact various materials into high density bales.

Another object is to provide a compress suited to the formation of high density bales which is comparatively lightweight, economical to construct, and adapted to rapid operations.

Another object is to provide a compress making available high density compression at any point within the range of mobility thereof.

Another object is to obviate the conventional requirements for excessive overcompression in the formation of bales.

Another object is to provide a combined dinkey compress, principal compacting compress adjacent to the dinkey compress, and means for conveying bales from the dinkey compress to the principal compacting compress.

Another object is to provide an improved combination of dinkey compress adapted to release confining bands from gin bales and the like and a bale grasping and carrying assembly operable to grasp bales released from their confining bands while retained under compression in the dinkey compress.

Another object is to provide an improved high density compression device adapted to be fed through an open upper end thereof and to discharge through an open lower end.

Further objects and advantages are to provide improved elements and arrangements thereof in a device of the character and for the purposes set forth.

Still further objects and advantages will become apparent in the subsequent description in the specification.

Referring in greater detail to the drawings:

The compress constituting the illustrative embodiment of the instant invention includes, as units of general reference, a gin bale compressor dinkey 20, an elevator and carriage assembly 21, a main or principal compress 22, a delivery conveyor 23, and a discharge conveyor 24.

The apparatus of this invention is supported on a main frame 30, conveniently formed of heavy channel members, preferably mounted on a plurality of wheels 31 thereby rendering the apparatus mobile. Although not shown in the drawings, this apparatus is intended to be drawn by a truck, tractor, traction engine or other similar vehicle. It also may be mounted for portability on a railroad car or immobilely positioned, as desired.

Main compress

Forward and rearward heads 32 are supported on the main frame 30 in horizontal spaced relation. A plurality of parallel tie rods 33 extend between corresponding corners of the heads 32 and are secured thereto by inner nuts 34 and outer nuts 35. Each of the tie rods 33 mounts thereon a pair of split blocks 36 which are rigidly connected to the tie rods by suitable bolts 37 extending therethrough. Transversely opposed blocks 36 support I-beam members 38 which extend transversely and substantially parallel to the heads 32. Upper and lower pairs of longitudinally extending horizontal rails 39 are mounted on and extend between the I-beam members 38.

A substantially rectangular platen 45 is rigidly mounted on the rearward head 32. Platen 45 is conveniently hollow-walled in construction and provides a compression face 46 disposed centrally of the compression compartment 22. The compression face 46 is further characterized by a plurality of horizontal grooves 47 extending across the entire face.

A plurality of two-way hydraulic rams 55 are mounted in a substantially horizontal position in the forward head 32. The rams 55 are provided with piston rods 56 rearwardly extending therefrom and mounting on the ends thereof an end compression platen 57. The end compression platen is substantially rectangular and is mounted in rectangular relation to its associated platens and parallel to the rearward platen 45. Platen 57 is likewise conveniently hollow-walled in construction and provides a compression face 58 having horizontal grooves 59 corresponding to the grooves 47 in platen 45. A pair of upper rollers 60 are secured to the end compression platen 57 and are adapted to ride on one of the longitudinally extending horizontal rails 39 adjacent thereto. The end platen 57 is also provided with lower opposed pairs of rollers 61 which rollably engage the extending flange of one of the lower longitudinal horizontally extending rails 39.

A stationary side platen 65 is mounted in a vertical frame 66 which in turn is supported between the transversely extending I-beam members 39. The side platen 65 has a solid wall portion 67 and a latticed portion 68. The latticed portion 68 includes a plurality of horizontally extending bars 69 in vertical spaced relation thus defining slots or spaces 70 therebetween. To provide additional reinforcement for each of the horizontal bars 69, each bar has a gusset plate 71 secured thereto and connected to the frame 66.

Referring to Figs. 2, 3, 5 and 7, it will be noted that a pair of elongated posts 75 extend vertically between the upper and lower transversely extending I-beams 38. A plurality of struts 76 are connected between the posts 75 and a plurality of hydraulic rams 77 mounted therein. Piston rods 78 are provided for each of the rams 77 and are connected at their free ends to a side compression platen 79. The platen 79 is a substantially rectangular member mounted in an erect position and providing a compression face 80. Horizontal grooves 81 are formed in the face 80 in horizontal alignment with corresponding grooves 47 and 49, said aligned grooves defining a band guiding channel about three sides of the main compression compartment 22. It will be noted that the grooves in the side compression platen 79 have longitudinally concave bottoms in order to return-bend bands thrust through the grooves 59 for return through the grooves 47 in a manner subsequently more fully to be described.

Upper and lower transverse horizontal rails 85 are supported in corresponding I-beams 38 and the side compression platen 79 is provided with flanged wheels 88 mounted on legs 89. Thus the side compression platen 79 is adapted to move inwardly and outwardly of the main compression compartment 22 while supported by the rolling engagement of wheels 88 on the rails 85.

A plurality of additional struts 95 are supported between the vertical posts 75. Journal bearing members 96 are connected to the struts 95 for rotatably receiving a vertical shaft 97 therein. A linkage 98 is rigidly connected to the shaft 97 at one end thereof and is connected at its opposite end to a piston rod 99. A hydraulic ram 100 is rigidly connected to one of the vertical posts 75 and is adapted to move the piston rod 99 inwardly or outwardly thereof. A lever 101 is rigidly connected at one end to the shaft 97 and extends outwardly therefrom in a direction opposite to that of the linkage 98 and is substantially in the same plane therewith. A further linkage 102 is pivotally connected to the other end of the lever 101 and extends therefrom for pivotal connection intermediate a pair of pivoted linkages 103 and 104. The other end of linkage 103 is pivotally connected adjacent to the vertical post 75 and the other end of linkage 104 is pivotally connected to the side compression platen 79. A similar linkage system extends between the vertical shaft 97 and the other side of the side compression platen 79 and for this purpose like numerals are employed for corresponding linkages. Also, a similar linkage system is employed at the bottom of the side compression platen 79, as will be evident in Figs. 5 and 7.

Figure 3:
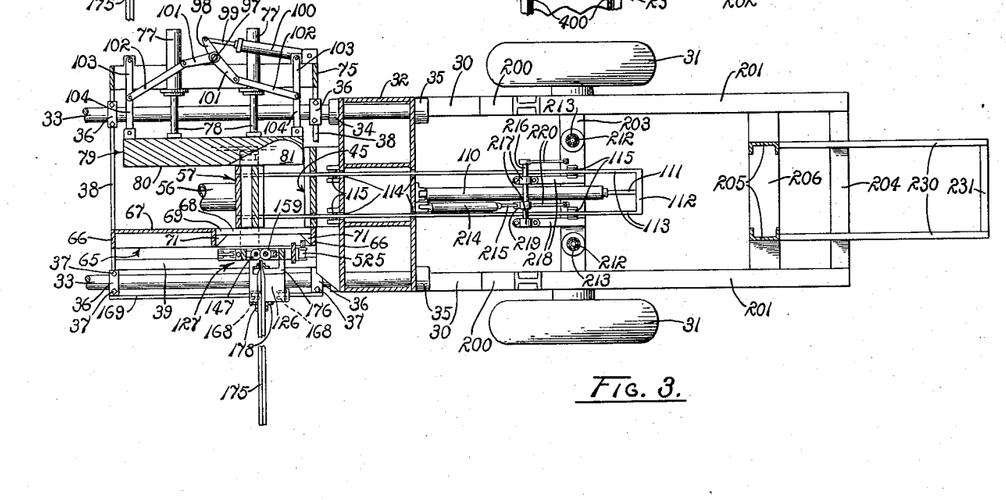
Fig. 3 is a fragmentary sectional plan view of the compress shown in Fig. 1, as viewed from a position represented by the line 3—3 thereof.

It will also be evident that actuation of the hydraulic rams 55 horizontally reciprocates the end compression platen 57 toward and from the stationary rearward platen 45 and actuation of the rams 77 and 100 transversely reciprocates the side compression platen 79 toward and from the stationary side platen 65. As seen in Fig. 3, the side compression platen 79 and the stationary side platen 65 are longer than the end compression platen 57. Further, the position of the rearward stationary platen 45 is such that during inward reciprocation of the side compression platen 79 the latter slides inwardly of the former and thus forms an overlapping edge therebetween. The end compression platen 57 is slidably received between the movable and stationary side compression platen 65 and 79 in the bale forming positions thereof. Cooperatively, the platens 45, 57, 65 and 79 define the main compression compartment which is open at both the top and the bottom, a feature of significance again referred to.

Figure 1:
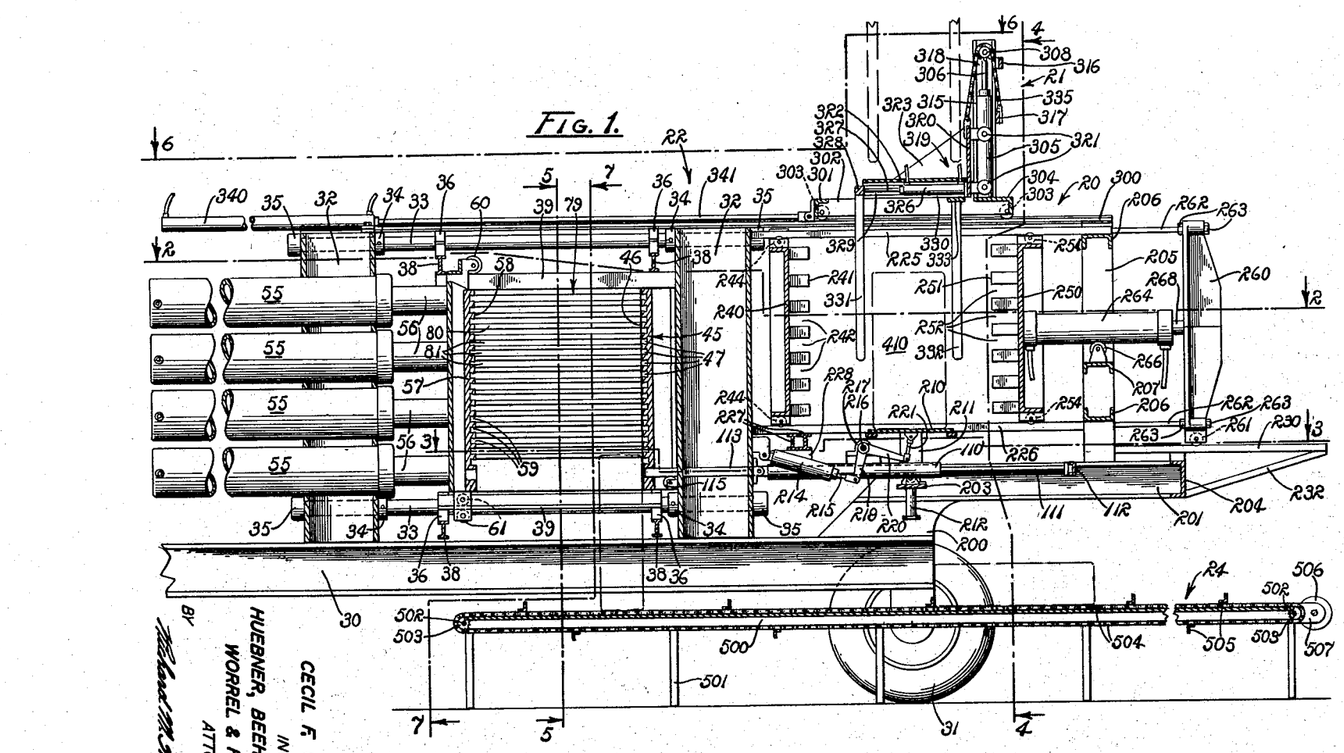
Fig. 1 is a fragmentary longitudinal section of a portable compress embodying the principles of the instant invention.
Figure 2:
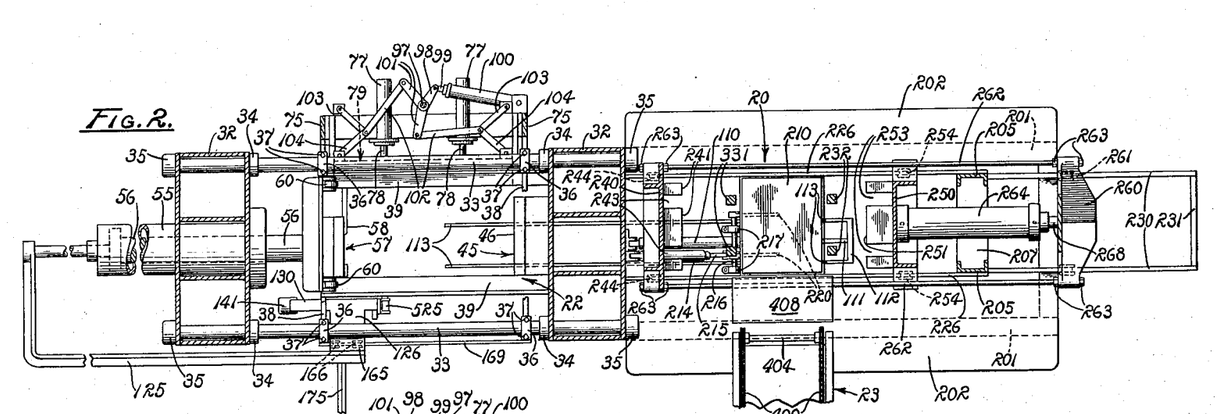
Fig. 2 is a sectional plan view of the portion of the compress shown in Fig. 1 viewed from the position represented by the line 2—2 in Fig. 1.

Referring to Figs. 1, 2 and 3, there will be seen a hydraulic ram 110 mounted on the rearward head 32 and extending rearwardly thereof. A piston rod 111 extends rearwardly and horizontally from the ram 110 and mounts a crosshead 112 at the rear end thereof. A pair of elongated arms 113 are connected at opposite ends of the crosshead 112 and extend horizontally and forwardly therefrom past the hydraulic ram 110 and through suitable slots 114 in the forward head 32. A pair of rollers 115 mounted on the forward head 32 are adapted rollably to receive the elongated arms 113. Upon actuation of the hydraulic ram 110, the elongated arms 113 are adapted to move between a bale supporting position at the bottom of the main compression compartment 22, as shown in Figs. 2 and 3, and a retracted position out of the main compress compartment as shown in Fig. 1.

Figure 8:
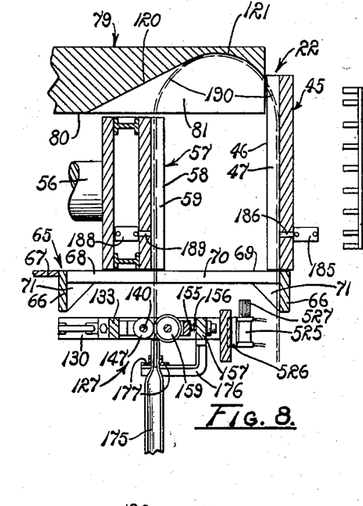
Fig. 8 is an enlarged fragmentary portion of the structure shown in Fig. 3 demonstrating a successive step in the operation of the structure involved.

As shown in Fig. 8 the bottom of grooves 81 of the side compression plate 80 are provided with concavities. These grooves have angular deflecting portions 120 which diverge inwardly from the compression face 80 for a considerable distance on each side of the approximate position assumed by the end compression platen 57 when in bale forming position. The grooves 81 are further provided with arcuate portions 121 which are continuous with the angular portions 120.

Figure 7:
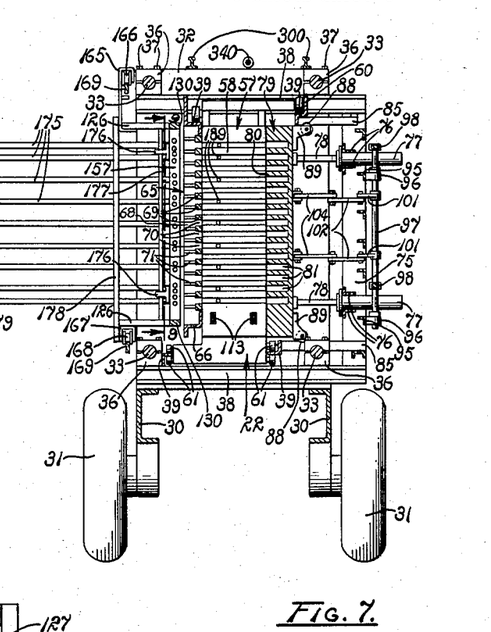
Fig. 7 is a transverse section of the compress as viewed from a position represented by the line 7—7 in Fig. 1.
Figure 9:
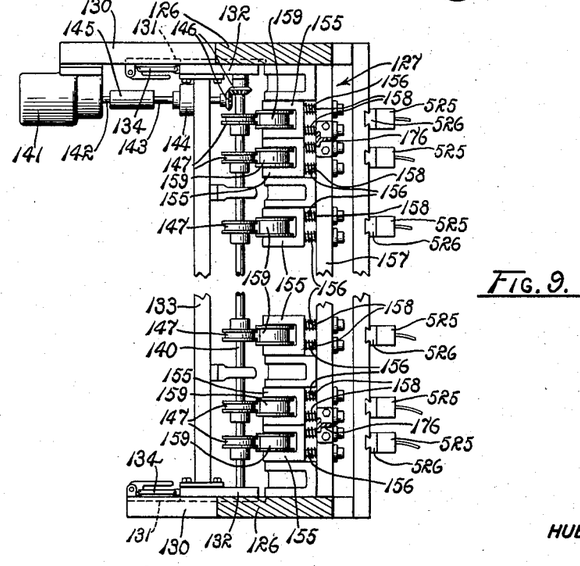
Fig. 9 is an enlarged fragmentary section of a band feeding portion of the compress, as viewed from a position represented by the line 9—9 in Fig. 7.

Referring to Fig. 2, a plurality of gooseneck brackets 125 are rigidly connected to the piston rods 56 of each of the hydraulic rams 55 and extend away from the main compression compartment 22 and are laterally and rearwardly extended centrally thereof. Upper and lower plates 126 are connected to the rearward ends of the gooseneck brackets 125 and extend transversely therefrom toward the compression compartment 22. A feeding head 127 of any suitable form is mounted between the upper and lower plates 126. The feeding head 127, as shown in Figs. 7, 8 and 9 includes a pair of substantially parallel arms 130 mounted in substantially horizontal positions on the upper and lower plates 126 and extended forwardly therefrom. The arms provide juxtapositioned guide ways 131 in which slide blocks 132 are mounted. The blocks 132 are rigidly interconnected by a feed bar 133 for corresponding movement longitudinally of their respective guide ways 131. Upper and lower toggle links 134 are mounted on the arms 130 and are connected to adjacent slide blocks 132, serving to shift the blocks longitudinally of their guide ways to move the feed bar 133 longitudinally of the feeding head 127.

A feeding shaft 140 is rotatably mounted in the slide blocks 132 in an erect position. A reversible electric motor 141 is mounted on the upper arm 130 and is provided with a drive shaft 142. A transmission shaft 143 is rotatably mounted in the feed bar 133 and is in alignment with the drive shaft 142. Bearings 144 are provided on the transmission shaft 143 adjacent to the post 133 and constrain the transmission shaft to predetermined axial position in the feed bar while permitting rotational movement thereof. A sleeve 145 is rigidly mounted on the drive shaft and has a slidably splined connection to the transmission shaft 143 to enable the feed bar 133 to be reciprocally positioned by means of the toggle linkage 134 without disturbing the driven connection between the drive shaft of the motor 141 and the transmission 143. A pair of beveled gears 146 mounted on the transmission shaft 143 and the feed shaft 140 induce rotation of the feed shaft by the rotation of the transmission shaft. A suitable number of band feeding rollers 147 are mounted on the feed shaft 140 in vertically spaced relation.

Each of the band feeding rollers 147 is provided with a bifurcated yoke 155 which yokes are mounted in horizontal alignment by pairs of bolts 156 slidably extended from each yoke through a vertical post 157 connected between the arms 130. Compression springs 158 are provided between the yoke 155 and the post 157 around each of the bolts 156 in order resiliently to position the yokes on the post in spaced relation to the post. A circumferentially grooved idler roller 159 is rotatably mounted in each yoke 155 for cooperative action with a respective band feeding roller 147.

The above described construction of feeding head 127 is quite similar to that shown in my copending application, Serial No. 305,106 filed August 19, 1952. However, the movement of the feeding head 127 in the present invention is conveniently limited to forward and rearward movement substantially parallel to the stationary side compression platen 65 and is not adapted for movement inwardly or outwardly to or from the main compression compartment 22. Therefore, it will be noted particularly in Figs. 2 and 7 that an upper bracket 165 is connected to the upper plate 126 and mounts a roller 166 therein. Correspondingly, a bracket 167 is mounted on the lower plate 126 and serves to support a roller 168 therein. Upper and lower rails 169 are mounted between the split blocks 36 adjacent to the side compression platen 65 and extend longitudinally and horizontal therebetween. The feeding head 127 is adapted to move parallel to the side compression plate 65 with the rollers 166 and 168 engaging the rails 169. As in my copending application, cited above, the feeding head 127 maintains precisely the same relation to the end compression platen 57 at all positions of relative movement thereof.

A band trough 175 is mounted in a horizontal position in the feeding head 127 in alignment with each of the spaces 70 between the horizontal bars 69. The troughs are of any desirable length and preferably are of V-shape throughout most of their length and provide delivery ends constricted to compressed U-shape closely adjacent to each of the idler rollers 159. The troughs are mounted on L-brackets 176 secured to the rigid vertical post 157 and provided with a pair of vertical angle members 177 on each side of the constricted end portion of the trough. Additional angle members 178 are secured on opposite sides of the troughs 175, as shown in Fig. 7 attached at opposite ends to the upper and lower brackets 165 and 167. Additional bracing members 179 may be provided for properly aligning and rigidifying the troughs 175.

A small hydraulic ram 185, or other breaking means, is mounted on the stationary rearward platen 45 in the hollow interior thereof and is provided with a piston rod 186 adapted to extend through an opening in the groove 47 thereof.

Similarly, another small hydraulic ram 188 is mounted in the end compression platen 57 in the hollow interior thereof and is provided with a piston rod 189 adapted to extend through openings in the plate and into the groove 59 thereof. As will be explained in greater detail, these hydraulic rams 185 and 188 are adapted upon actuation to hold bands, as 190, in position in corresponding aligned grooves 47, 59 and 81. Preferably, the tips of each of the piston rods 186 or 189 are provided with frictional material in order more securely to engage the bands.

*Gin bale compress*

Figures 4, 5, 6:
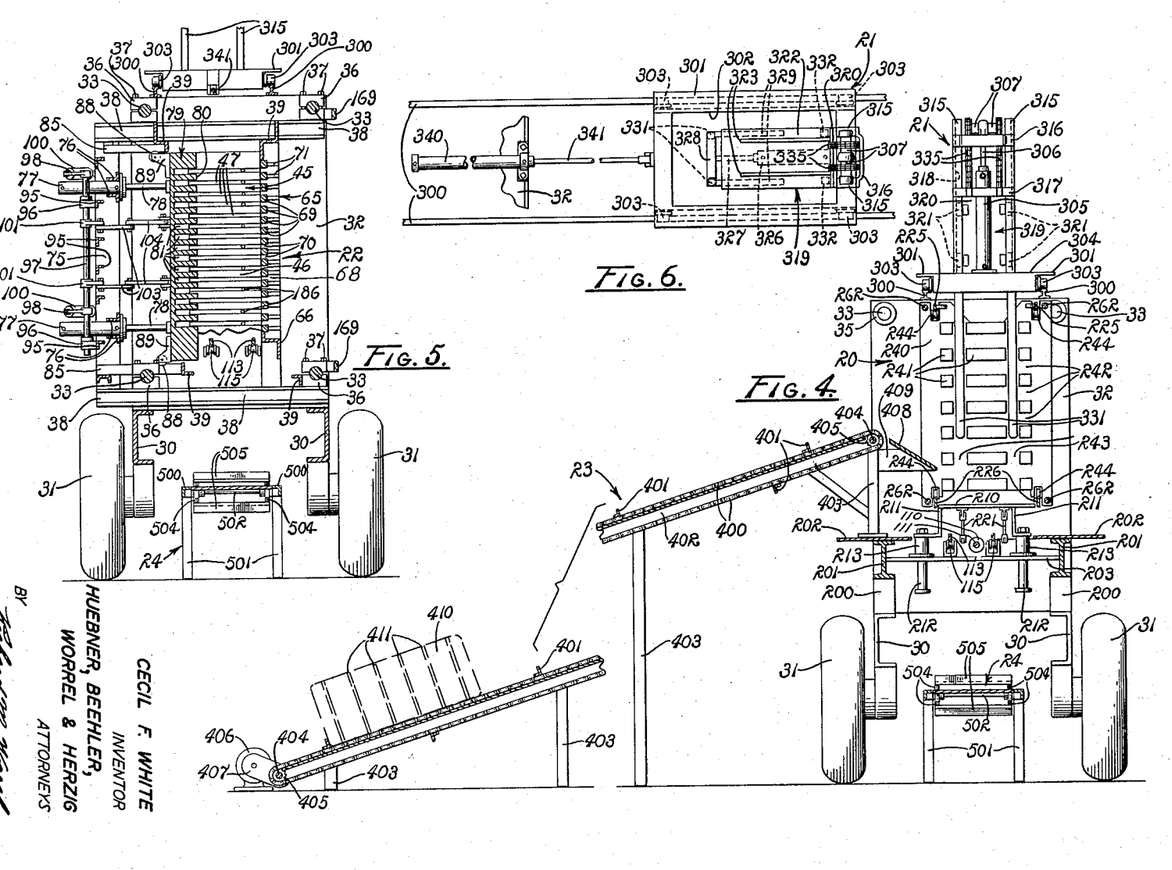
Fig. 4 is a transverse section of the compress taken at the position represented by the line 4—4 in Fig. 1.
Fig. 5 is a transverse section through the compress taken at the position represented by the line 5—5 in Fig. 1.
Fig. 6 is a fragmentary plan view of a portion of the structure of the compress shown in Fig. 1, as viewed from a position represented by line 6—6 in Fig. 1.

The main support frame 30 is provided at its rearward end thereof with an upwardly rearwardly extending portion 200 which further supports an auxiliary frame 201 including substantially rectangularly arranged channel members open at the forward end thereof. As best seen in Figs. 2 and 4, operator platforms 202 are mounted on opposite sides of the auxiliary frame 201. A substantially rectangular frame is mounted erectly on the rearward portion of the auxiliary frame 201 consisting of a pair of erect channel members 205 interconnected by upper and lower substantially horizontal channel members 206. An intermediate channel member 207 is provided between the channel members 206.

A bale plate or platform 210 is mounted on a pair of L-brackets 211 which are connected at their lower flanges to elevator rods 212 extending downwardly through suitable guides 213. The guides are mounted on the forward transverse channel 203. A hydraulic ram 214 is rigidly mounted on the rearward side of the rear head 32 and provides a piston rod 215 reciprocal downwardly therefrom. A shaft 216 is mounted in a suitable bearing bracket 217 supported on arms 218 mounted on the forward channel 203 and extending forwardly therefrom. A lever 219 is pivotally connected at one end to the piston rod 215 and at the opposite end is rigidly connected to the shaft 216 for effecting oscillation thereof. A pair of lift levers 220 are rigidly connected at one end thereof to the shaft 216 and at the opposite ends mount push arms 221, the latter being connected to the bale platform 210.

A pair of upper longitudinally extending, horizontal rails 225 are mounted between the rearward head 32 and the upper cross channel 206. A pair of lower longitudinally extending horizontal rails 226 are mounted between the rearward head 32 and the lower cross channel 206. The lower rails 226 are further supported adjacent to the forward ends thereof by a pair of transversely extending I-beams 227 supported on a bracket 228 mounted on the rearward head 32.

A pair of longitudinally and rearwardly extending horizontal rails 230 are mounted on the upwardly extended vertical channels 205 and extend rearwardly of the apparatus. A cross piece 231 joins the rails 230 and suitable bracing members 232 are provided to give rigidity to the rails.

A forward compression platen 240 having a compression face 241 provided with horizontal grooves 242 and a pair of vertical grooves 243 is mounted on the upper and lower rails 225 and 226 by upper and lower rollers 244. A rearward compression plate 250 having a compression face 251 provided with horizontal grooves 252 and a pair of vertical grooves 253 is likewise mounted on the rails 225 and 226 by upper and lower rollers 254. A rear head member 260 of substantially rectangular shape is mounted for movement on the rearwardly extending rails 230 by rollers 261. Upper and lower pairs of tie rods 262 are connected by nuts 263 between the forward compression platen 240 and the rear head 260. An hydraulic ram 264 is mounted on a roller 266 supported on the intermediate channel 207. A piston rod 268 of the ram is connected to the rear head 260. Inasmuch as the platens 240 and 250 are free to move toward and from each other, it will be apparent that expansion of the ram 264 exerts a thrust on the platen 250 toward the platen 240 and through the rods 262 draws the platen 240 toward the platen 250. Conversely, contraction of the ram separates the platens 240 and 250. The platens 240 and 250, the ram 264, the head 260, and the rods 262 constitute a freely floating assembly which, while capable of forcing the plates toward each other and retracting the same, permits the plates automatically to center on any object disposed therebetween.

*Elevator and carriage*

A pair of substantially parallel longitudinal rails 300 are supported on the upper cross channel 206 of the dinkey compress 20 and the forward head 32 of the principal compression compress. As evident in Fig. 1 the rails extend above the dinkey compress and the principal compress. A frame 301 of substantially rectangular shape and defining a central opening 302 therein is provided with a plurality of wheels 303 for rolling engagement on the longitudinal rails 300. The frame 301 is provided with a rear ledge 304 on which is mounted in an upwardly erect position an hydraulic ram 305. A piston rod 306 extends upwardly from the hydraulic ram 305 and is connected at its upper end to a cross head 307 having a pair of sprocket wheels 308 rotatably mounted thereon.

A pair of spaced, upstanding channel members 315 are mounted on the ledge 304 on opposite sides of the hydraulic ram 305. A pair of cross braces 316 and 317 are connected between the angle members 315, as best seen in Fig. 4. The vertical channel members 315 provide vertical rails or grooves 318 therein for the guided reception of wheels. A cart 319 including a vertical plate 320 is provided with wheels 321 in rolling engagement with the vertical rails 318 in straddling relation to the hydraulic ram 305. An horizontal plate 322 is mounted adjacent to the lower edge of the vertical plate 320 and extended forwardly therefrom. A pair of gusset plates 323 are mounted between the horizontal and vertical plates of the cart 319 for the obvious purpose of providing additional reinforcement therebetween. An hydraulic ram 326 is mounted beneath the horizontal plate 322 and is provided with a piston rod 327 which extends forwardly therefrom in a substantially horizontal position. A cross head 328, best seen in Fig. 6, is connected to the piston rod 327 and at the outer end thereof is provided with rearwardly extending guide arms 329. The horizontal plate 322 is also provided with depending flange portions along the lateral edges thereof and the rearwardly extending guide arms 329 are adapted for guided movement forwardly and rearwardly between flanged portions 330. A pair of movable pickup arms 331 are dependently mounted at the outer ends of the cross head 328 and a pair of stationary pickup arms 332 are similarly dependently mounted from a cross support piece 333 which extends between the flange portion 330 on the horizontal plate 322.

A pair of chains 335 are connected between the vertical plate of cart 319 and the lower cross piece 317 over respective sprocket wheels 308 and guided by the cross piece 316. It will be apparent that upon actuation of hydraulic ram 305, the cart 319 is adapted to be lifted or lowered whereupon the pickup arms 331 and 332 likewise are lifted and lowered. Upon actuation of the hydraulic ram 326, the pickup arms 331 are adapted to move toward the stationary pickup arms 332.

An elongated hydralic ram 340 is mounted on the forward head 32 and is provided with an elongated piston rod 341 extending rearwardly therefrom in a substantially horizontal position. The rearward end of the piston rod 341 is connected to the frame 301 and, as will be quite apparent, the actuation of ram 340 operates to move the frame 301 on the longitudinal rails 300 from its position over the dinkey 20 to a position over the main compress compartment 22 and return. As will be understood, it is first necessary before movement of the frame 301 can be effected, to lift the pickup arm into a position at least above the level of the head 32. To permit adequate elevational movement, the piston rod 306 employed in the ram 305 preferably includes multiple telescopic units of well-known form which make possible maximum extension in excess of the overall length of the cylinder of the ram under conditions of maximum contraction. Thus the ram 305 can extend to a maximum length much greater than twice its length under conditions of maximum contraction.

*Delivery conveyor*

Referring in particular to Figs. 2 and 4, the delivery conveyor 23 is seen to include an inclined endless conveyor belt 400 having a plurality of spaced strips 401 therealong for preventing downward slippage of cotton bales 410 during their upward ascent on the conveyor belt. The conveyor belt 400 is mounted on a support frame 402. The frame 402 is provided with a plurality of vertical support posts 403 and it will be noted that the uppermost pair of posts 403 are rested on the operator's platform 202. Upper and lower shafts 404 are rotatably mounted in the respective vertical support posts and provide at the outer ends rollers or sprockets 405 for engaging and rotating the conveyor belt 400. A motor 406 is mounted in any convenient location adjacent to the conveyor belt 400 and any convenient driving connection 47 provided in driving connection between the motor and the lower shaft 404. Adjacent to the upper end of the conveyor belt 400 is a delivery chute 408 angularly declined from the belt and mounted on a bracket 409 attached to the upper vertical support posts 403. It will be evident that a gin bale 410 elevated on the conveyor belt 400 will be directed downwardly by the delivery chute 408 in pivoting movement toward the bale platform 210 of the dinkey to upstanding position thereon.

*Discharge conveyor*

As shown in Figs. 1, 4 and 5, the discharge conveyor 24 includes a substantially horizontal support frame 500 mounted on a plurality of vertical posts 501. The endmost vertical posts journal horizontal shafts 502 therein which are provided at the outer ends thereof with sprocket wheels 503. A conveyor belt 504 is mounted on the support frame 500 in driven connection to the sprocket wheels 503 for movement therearound in a clockwise direction as viewed in Fig. 1. The conveyor belt is preferably provided with a plurality of spaced strips 505 for engaging a discharged bale to carry it along with the conveyor belt toward the end thereof. A motor 506 is mounted adjacent to the rearward end of the conveyor belt 504 and some convenient driving means 507 is connected between the motor and the rear shaft 502 to motivate the belt. As will be evident, the forward portion of the conveyor belt 504 is disposed beneath the open bottom end of the main compression compartment 22 and is adapted to receive a bale discharged therefrom and automatically to deliver such bale outwardly from underneath the apparatus to a position rearwardly thereof.

*Operation*

The operation of this invention is believed to be readily apparent and is briefly summarized at this point. As previously explained, the apparatus of this invention is adapted to receive gin bales or the like having constraining bands thereabout, to release the gin bales from their bands, to compress the gin bales into higher density bales, and to place constraining bands about the higher density bales.

Referring to Fig. 4, a gin bale 410 having constraining bands 411 therearound is first placed on the delivery conveyor 23 for elevational movement up to the dinkey compress 20. The gin bale 410 slides downwardly on the delivery chute 408 and onto the platform 210 in an upright, endwardly erect position, between the platens 240 and 250 as seen in Fig. 1.

By controlled actuation of the ram 214, the platform 210 is raised or lowered so that the bands 411 are juxtapositioned with the horizontal channels 242 of the platens 240 and 250. The hydraulic ram 264 is then actuated whereupon both the forward and rearward platens, 240 and 250, move toward each other and the gin bale 410 on the platform 210. It is significant to note that the forward and rearward compression platens are self-centering on the gin bale 410. This is true since when the hydraulic ram 264 is actuated, the resultant thrust is transmitted equally to both of the platens, the platens, ram, head 260, and rods 262 being free floating.

When suitable pressure has been applied to the compression platens 240 and 250, an operator standing on the operator's platform 202 unloosens the bands 411 and removes them from the bale through the aligned grooves 242 and 252 in the platen faces.

With pressure still applied to the platens 240 and 250, the hydraulic ram 305 is operated to lower the cart 319 and therefore the pickup arms 331 and 332 into the compression chamber of the dinkey. In this regard it will be noted that the movable pickup arm 331 slidably fit within the vertical grooves 243 in the forward compression platen and the stationary pickup arms 332 similarly slidably fit within the vertical grooves 253 of the rearward compression platen. After the pickup arms have been lowered and therefore are disposed on opposite sides of the bale 210, the hydraulic ram 326 is operated to move the movable pickup arm 331 inwardly whereupon the bale 410 is grasped between the pickup arms. The hydraulic ram 264 is then operated to relieve the pressure on the forward and rearward compression platens 240 and 250 whereupon the pickup arms alone hold the bale therebetween. The hydraulic ram 305 is then actuated to lift the cart 319 whereupon the pickup arms lift the bale 410 therebetween upwardly through the opening 302 in the frame 301 to a position where the bale 410 clears the upper edge of the heads 32.

The hydraulic ram 340 is then actuated to move the entire carriage assembly 21 on the longitudinal rail 300 to a position over the main compression compartment 22. When the bale 410 is aligned over the open upper end of the main compression compartment 22 by the hydraulic ram 340, the hydraulic ram 305 is operated to lower the pickup and therefore the bale 410 into the main compression compartment. Before or after such operation, the hydraulic ram 110 is operated to extend the elongated arm 113 into the bale supporting position within the main compression compartment, as best shown in Figs. 2 and 3. The pickup arms lower the bale onto the elongated arms 113 whereupon the hydraulic ram 326 is operated to release the pickup arm from around the bale and the hydraulic ram 305 retracts the pickup arm from the main compression compartment. Hydraulic ram 340 is then operated in the reverse direction to return to carriage assembly 21 to its initial position over the gin bale preparatory to a successive cycle of operation. Obviously during the delivery of the bale to the main compressor 22, a succeeding bale may be delivered to the dinkey or pre-press compartment 20 and the operation be substantially continuous.

With the bale resting in an erect position on the elongated arms 113 within the main compression compartment 22, the rams 55 are actuated to force the principal end compression platen 57 against the bale to subject the bale to compression between the stationary or rearward platen 45 and the end compression platen 57. During the inward movement of the end compression platen 57, the feeding head 127 is correspondingly rearwardly moved with the platen 57 to maintain alignment with the horizontal grooves 59.

The bale is subjected to sufficient pressure to obtain the desired density and no substantial excess pressure is required. When the desired compression is realized, bands 190 are laid in the troughs 175 with the ends thereof extended between the flanges of the idler rollers 159. The toggles 134 are then manipulated to move the feeding rollers 147 into engagement with the bands. The reversible motor 141 is then energized so as to rotate the feeding rollers 147 in a counterclockwise direction, as viewed in Fig. 9. The bands are engaged between the rollers 147 and 159 and are thrust through the spaces 70 between the horizontal bars of the side stationary platen 65. The bands travel forwardly and enter the grooves of the end compression platen 57, the angularly related portions 120 and arcuate portions 121 of the grooves in the side compression platen 79 and returned through the grooves 47 in the rearward stationary platen 45, all as shown in Fig. 8. Obviously, it is not necessary to insert a band in each of the troughs or in each of the longitudinal grooves defined in the platens but only the number of bands which are deemed necessary in the particular instance.

Figures 12, 13:
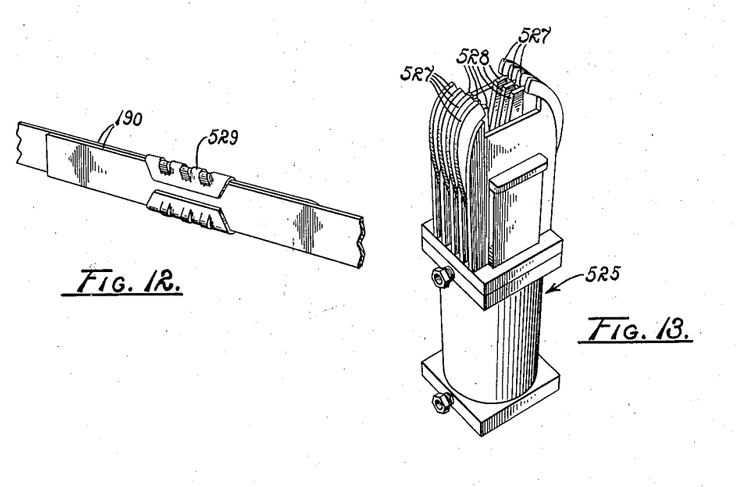
Fig. 12 is a perspective of the elements shown in Fig. 11 viewed from the opposite side thereof.
Fig. 13 is a perspective of a clip crimping apparatus conveniently suited to operation in the device of the subject invention.

When the leading or running ends of the band emerge from the grooves 47, the rams 185 are actuated and the motor 141 reversed. The piston rods 186 engage the bands and hold the ends thereof in the grooves in position while the reversing of the motor tightens the bands about the bale into the position shown in Fig. 8. When the bands have been adequately tightened, the motor 141 is stopped and the rams 188 actuated whereupon the piston rods 189 associated therewith extend to engage the bands disposed in grooves 59. The toggles 134 are then released to retract the feeding rollers 147 from the bands and the bands released and opposite ends thereof folded to overlying relation. So conditioned, opposite ends of the bands are securely held by rams 185 and 186 tensioned about three sides of the bale and are accessible for securing by any suitable means. Convenient and speedy securing means are shown in Figs. 8 to 13, both inclusive, which have been found excellently suited to the purpose. A plurality of hydraulically actuated crimping mechanisms 525 are mounted on the post 157 for reciprocal movement toward and from the main compressor 22 by means of slide brackets 526 or other suitable means. The crimping mechanisms each employ anvil teeth 527 between which opposing crimping teeth 528 are pivoted for crimping and releasing purposes, as best shown in Fig. 13. The crimping mechanisms are mounted so that the crimping teeth 528 are vertically movable and such a mechanism provided for each band 412 located about a high density bale in the main compressor 22.

Figure 10:
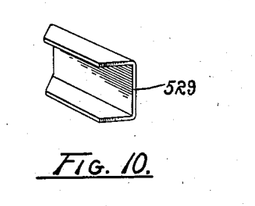
Fig. 10 is a perspective of a band fastening clip suitable to the securing of bands about high density bales formed in the compress.
Figure 11:
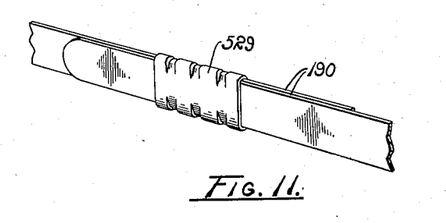
Fig. 11 is a fragmentary perspective of a bale securing band having opposite ends interconnected by the clip shown in Fig. 10, the structure being viewed from its normally externally disposed side when in band confining position.

As the ends of the bands 190 are overlapped, they are fitted into substantially U-shaped clips 529, of the form shown in Fig. 10. A crimping mechanism is then shoved into position so that the clip is received between the teeth 528 and 527 whereupon the mechanism is actuated to fold the clip about the overlapped bands and crimp the clip and the bands to the condition shown in Figs. 11 and 12. The crimping mechanisms and clips are well-known and thus not described in greater detail. Suffice it to observe that this method of securing the bands assures rigid interconnection of the opposite ends thereof so that no slippage can occur. Actually, when the ends are so interconnected, the connection is stronger than the bodies of the bands themselves. The slidable mounting of the crimping mechanisms also permit ready retraction thereof so that they are out of the way of subsequent operations.

When the bale has been banded, the hydraulic rams 55, 77 and 100 are contracted to relieve the high density bale from compression.

During the compression of the bale into its highly compressed condition and during the banding thereof, it will be remembered that the bale is resting upon the elongated arms 113. Therefore, the hydraulic ram 110 is actuated to retract the arms from the main compression compartment to the position shown in Fig. 1 when the banding operation is completed. It will be quite apparent that removal of the arms 113 from compartment 22 acts to slide the banded high density bale therefrom for discharge through the open lower end of the main compression compartment 22. The bale therefore falls downwardly onto the discharge conveyor belt 504 and incident to rotational movement of the belt, is pushed over onto its side into a substantially horizontal position for conveyance by the belt 504 rearwardly thereof from beneath the apparatus.

In commercial operation, the apparatus of the present invention is found substantially to increase the speed and to reduce the cost of removing the bands from gin bales, comprising the gin bales into high density bales, and rebanding the same. The number of workmen conventionally required for the purpose have been reduced to a fraction of that previously demanded. The association of the pick-up arms of the elevator and carriage 21 with the dinkey compress 20 has proved an excellent solution to the grasping of the released bales while still confined in a mass of sufficient form for handling purposes. The delivery of the bales into the top of the main compression chamber 22 and their discharge from the bottom thereof have proved conducive to speedy operation. The avoidance of the conventional requirement for a side access door in the main compression compartment 22 has permitted a substantial reduction in weight with increased strength.

Although the invention has been herein shown and described in what is at present conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a cotton compress adapted to receive loosely compressed bandless bales of cotton, to compress such bales into high density bales, to place constraining bands about the high density bales, and to discharge the banded high density bales therefrom comprising a frame, two pairs of opposing compress platens mounted in the frame in substantially rectangular relation defining a compression compartment therebetween having an open receiving end adapted to receive loosely compressed bandless bales of cotton and an open discharge end adapted to discharge high density bales of the cotton and defining an unobstructed straight path through the compartment, three of the consecutively adjacent platens having aligned band guide channels therein about three sides of the compression compartment, the other compress platen having horizontal slots therein aligned with the band guide channels for receiving bands therethrough, means mounting a platen of each pair rigidly in the frame, powered means mounting the opposite platen of each pair for controlled movement toward and from its respectively opposite rigidly mounted platen, band feeding means adapted to feed bands through the slots and the aligned channels in the consecutively adjacent platens, and substantially horizontal bale supporting arms mounted for substantially horizontal reciprocal movement between a position in the compression compartment adjacent to the discharge end thereof and a position retracted from the compression compartment.

2. In a doorless compress adapted to receive comparatively loosely compressed bales of cotton and the like and to compress such bales into bales of higher density, a frame, two pairs of substantially parallel platens means mounting the platens in the frame in successively edgewardly adjacent relation circumscribing a compression compartment defined thereby so that the platens of each pair are in opposed spaced parallel relation at all times and so that the platens are always in compartment defining relation, the compartment having open opposite ends and having a straight path between such ends to receive means for delivering loosely compressed bales of cotton into one open end of the compartment, means for removing compressed bales of higher density from the opposite end of the compartment, and powered means connected to the platens for urging the platens of each pair relatively toward and from each other to compress bales disposed in the compartment about all circumscribing sides thereof and to release the same, one of the platens being slotted transversely of the compartment to receive bale bands, and the other platens having guide channels therein transversely of the compartment and disposed inwardly thereof, corresponding channels and slots being in endward registration and circumscribing the compartment to receive and guide bands in circumscribing extension about the bales while the bales are compressed about all of said circumscribing sides.

3. A doorless compress comprising a frame, pairs of opposing substantially parallel rectangular platens positioned in the frame in successively edgewardly adjacent relation circumscribing a compression compartment defined thereby having a straight path therethrough between open opposite ends, means mounting one platen of each pair rigidly in the frame, powered means mounting the opposite platen of each pair in the frame for controlled rectilinear movement only toward and from its respective opposite rigidly mounted platen being maintained in opposed substantially parallel relation to said opposite platen during such movement, one of the platens having transverse slots therein and the other platens having channels in registration with the slots circumscribing the compartment and disposed inwardly theretoward, and means for feeding bands inwardly through the slots of the slotted platen for guided passage through the channels about the compartment.

4. A doorless compress comprising a frame, pairs of opposing substantially parallel rectangular platens positioned in the frame in successively edgewardly adjacent relation circumscribing a substantially rectangular compression compartment defined thereby having open opposite ends, said open ends constituting the only access to the compartment for delivery and discharge of compressing material, successively adjacent platens being transversely in substantially right angular relation, means mounting one platen of each pair rigidly in the frame, powered means mounting the opposite platen of each pair in the frame for controlled rectilinear movement toward and from its respective opposite rigidly mounted platen and being maintained in opposed substantially parallel relation to said opposite platen whereby the platens are always in said rectangular compartment defining relation, one of the platens having transverse slots therein and the other platens having channels in registration with the slots circumscribing the compartment and disposed inwardly theretoward, means for feeding bands inwardly through the slots of the slotted platen for guided passage through the channels about the compartment, means mounted for movement to and from an open end of the compartment for carrying loosely compressed bales of cotton and the like into the compartment, and means movable to and from the opposite end of the compartment for releasing compressed bales from the compartment.

5. A compress for compressing material in bales and banding the material while under circumscribing compression comprising pairs of opposing substantially parallel rectangular platens positioned in the frame in successively edgewardly adjacent relation circumscribing a compression compartment defined thereby, means mounting the platens for relative movement of the platens of opposing pairs of platens toward and from each other whereby material in the compartment is compressed between all of said circumscribing platens, one of the platens having transverse slots therein and the other platens having channels in registration with the slots circumscribing the compartment and disposed inwardly theretoward, and means for feeding bands inwardly through the slots of the slotted platen for guided passage through the channels about the compartment and into their respective slots.

6. A doorless compress for compressing material in bales and banding the bales while under circumscribing compression comprising a frame, opposing pairs of substantially parallel platens positioned in the frame in successively edgewardly adjacent relation circumscribing a compression compartment defined thereby having a straight path therethrough between open opposite ends, means mounting the platens for relative movement of the platens of opposing pairs of platens toward and from each other whereby material in the compartment is compressed from four sides, one of the platens having transverse band receiving slots therein and the other platens having channels in registration with the slots circumscribing the compartment and disposed inwardly theretoward, means for feeding bands inwardly through the slots of the slotted channel for guided passage through the channels about the compartment, and bale supporting means mounted adjacent to an open end of the compartment for movement between a bale supporting position within the compartment and a position retracted from the compartment.

7. A doorless compress comprising a frame, pairs of opposing substantially parallel rectangular platens positioned in the frame in successively edgewardly adjacent relation circumscribing a compression compartment defined thereby having a straight path therethrough between open opposite ends, means mounting one platen of each pair rigidly in the frame, and powered means mounting the opposite platen of each pair in the frame for controlled rectilinear movement only toward and from its respective opposite rigidly mounted platen and being maintained in substantially parallel relation to said opposite platen during such movement, one of the platens having transverse band receiving slots therethrough and the other platens having channels in registration with the slots circumscribing the compartment and disposed inwardly theretoward.

References Cited in the file of this patent

UNITED STATES PATENTS

| Number | Name | Date |
|---|---|---|
| 223,152 | LaDow et al. | Dec. 30, 1879 |
| 430,986 | Blackman | June 24, 1890 |
| 778,446 | Clark et al. | Dec. 27, 1904 |
| 850,105 | Spencer | Apr. 9, 1907 |
| 1,033,829 | Saddlemire | July 30, 1912 |
| 1,062,465 | Hill | May 20, 1913 |
| 1,096,397 | Sheppard | May 12, 1914 |
| 1,121,571 | Sheppard | Dec. 15, 1914 |
| 1,164,519 | Hill | Dec. 14, 1915 |
| 2,353,221 | Clifton et al. | July 11, 1944 |
| 2,428,620 | Ernst et al. | Oct. 7, 1947 |
| 2,629,316 | Tillinghast | Feb. 24, 1953 |
| 2,732,792 | White | Jan. 31, 1956 |